US010096074B2

(12) United States Patent
Khanzode

(10) Patent No.: US 10,096,074 B2
(45) Date of Patent: Oct. 9, 2018

(54) SYSTEMS AND METHODS FOR EXPANDING RELEVANT SEARCH RESULTS IN ELECTRONIC DISCOVERY

(71) Applicant: Veritas Technologies LLC, Mountain View, CA (US)

(72) Inventor: Sandeep Khanzode, Mumbai (IN)

(73) Assignee: Veritas Technologies LLC, Mountain View, CA (US)

( * ) Notice: Subject to any disclaimer, the term of this patent is extended or adjusted under 35 U.S.C. 154(b) by 718 days.

(21) Appl. No.: 14/613,393

(22) Filed: Feb. 4, 2015

(65) Prior Publication Data

US 2016/0180479 A1    Jun. 23, 2016

(30) Foreign Application Priority Data

Dec. 23, 2014  (IN) ............................ 3876/DEL/2014

(51) Int. Cl.
*G06F 17/30* (2006.01)
*G06Q 50/18* (2012.01)

(52) U.S. Cl.
CPC ....... *G06Q 50/18* (2013.01); *G06F 17/30528* (2013.01); *G06F 17/30598* (2013.01); *G06F 17/30867* (2013.01)

(58) Field of Classification Search
CPC ......... G06F 17/30528; G06F 17/30598; G06F 17/30867
USPC ...................................................... 707/708
See application file for complete search history.

(56) References Cited

U.S. PATENT DOCUMENTS

| | | | | |
|---|---|---|---|---|
| 6,347,313 | B1* | 2/2002 | Ma | G06F 17/30256 707/711 |
| 6,513,027 | B1* | 1/2003 | Powers | G06F 17/3071 704/10 |
| 2011/0093471 | A1* | 4/2011 | Brockway | G06F 17/30616 707/747 |

(Continued)

OTHER PUBLICATIONS

Sandeep Khanzode; Systems and Methods for Culling Search Results in Electronic Discovery; U.S. Appl. No. 14/613,395, filed Feb. 4, 2015.

(Continued)

*Primary Examiner* — Joshua Bullock
(74) *Attorney, Agent, or Firm* — FisherBroyles LLP

(57) ABSTRACT

The disclosed computer-implemented method for expanding relevant search results in electronic discovery may include (1) creating a file-participant cluster that links a file within a data source to a set of participants that had interactions with the file, (2) determining that the file-participant cluster exceeds a threshold level of similarity relative to another file-participant cluster, (3) merging the file-participant clusters into a merged file-participant cluster that identifies files and participants linked by the file-participant clusters, (4) receiving, from a user involved in electronic discovery, a query to search the data source for files that match one or more search parameters, and then in response to receiving the query, (5) determining that the file linked by the file-participant cluster matches the search parameters, and (6) providing, to the user, a search result that identifies the merged file-participant cluster. Various other methods, systems, and computer-readable media are also disclosed.

20 Claims, 8 Drawing Sheets

(56) References Cited

U.S. PATENT DOCUMENTS

| | | | |
|---|---|---|---|
| 2012/0215796 A1* | 8/2012 | Zhang | G06F 17/30663 707/750 |
| 2014/0164314 A1 | 6/2014 | Ahuja et al. | |
| 2015/0074007 A1 | 3/2015 | Gabriel et al. | |
| 2017/0032039 A1 | 2/2017 | Stevenson et al. | |

OTHER PUBLICATIONS

"Predictive Coding Defensibility and the Transparent Predictive Coding Workflow", https://www4.symantec.com/mktginfo/whitepaper/Clearwell/21282415-1_GA_WP_Transparent-Predictive-Coding_0913.pdf, as accessed Nov. 24, 2014, White Paper, Symantec Corporation, (2013).

"Cosine similarity", http://en.wikipedia.org/wiki/Cosine_similarity, as accessed Nov. 24, 2014, Wikipedia, (Jan. 7, 2008).

Bang, Krutika P., et al., "Knowledge Discovery on Web Blog Mining", https://www.academia.edu/5742583/Knowledge_Discovery_On_Web_Blog_Mining_, as accessed Nov. 24, 2014, International Journal of Engineering Sciences & Research Technology, (Feb. 2013), pp. 191-194.

* cited by examiner

| Merged File-Participant Cluster 500 |||
|---|---|---|
| Files 502 | Participants 504 | Interactions 506<br>ID / File / Participant / Interaction / Time |
| File A<br><br>File B<br><br>File C | Participant 1<br><br>Participant 2<br><br>Participant 3 | I01 / A / 1 / Create / 2014-10-20 10:45:15 |
| | | I02 / A / 1 / Modify / 2014-10-22 14:13:03 |
| | | I03 / C / 1 / Access / 2014-11-03 09:12:55 |
| | | I04 / B / 2 / Create / 2014-09-12 16:12:45 |
| | | I05 / A / 2 / Access / 2014-10-30 12:55:02 |
| | | I06 / C / 3 / Create / 2014-10-21 10:12:14 |
| | | I07 / A / 3 / Access / 2014-11-01 09:03:03 |
| | | I08 / B / 3 / Modify / 2104-09-15 15:15:03 |

*FIG. 5*

| Interaction Time Index 600 ||
|---|---|
| Time Stamp 602 | Interaction ID 604 |
| 2014-09-12 16:12:45 | I04 |
| 2104-09-15 15:15:03 | I08 |
| 2014-10-20 10:45:15 | I01 |
| 2014-10-21 10:12:14 | I06 |
| 2014-10-22 14:13:03 | I02 |
| 2014-10-30 12:55:02 | I05 |
| 2014-11-01 09:03:03 | I07 |
| 2014-11-03 09:12:55 | I03 |

*FIG. 6*

SYSTEMS AND METHODS FOR EXPANDING RELEVANT SEARCH RESULTS IN ELECTRONIC DISCOVERY

BACKGROUND

In preparation for trial, parties to a lawsuit may request certain electronic files and/or documents from one another by way of electronic discovery (sometimes referred to as "e-discovery"). The parties may perform searches for files and/or documents using an electronic discovery tool that analyzes and/or filters the files and/or documents to provide matching search results. These searches may rely extensively on certain keywords specified by the parties. Unfortunately, such keyword searches may be somewhat imprecise and, as a result, yield a vast and unwieldy number of results. In an effort to mitigate this problem, the parties may increase the number of keywords used to perform their searches, thereby obtaining more targeted results but, at the same time, increasing the likelihood of excluding certain relevant files and/or documents from the results.

The relevancy of files and/or documents to a lawsuit may extend beyond certain keywords. Unfortunately, conventional electronic discovery tools may be unable to determine the relevancy of files and/or documents due to limited searching capabilities and/or functionality. The instant disclosure, therefore, identifies and addresses a need for improved systems and methods for expanding relevant search results in electronic discovery.

SUMMARY

As will be described in greater detail below, the instant disclosure describes various systems and methods for expanding relevant search results in electronic discovery by creating file-participant clusters that link certain files with their participants (including, e.g., the people who created, modified, and/or accessed the files). These file-participant clusters may be merged with one another based at least in part on certain criteria (including, e.g., a common set of participants, related content, and/or a common timeframe). The resulting set of file-participant clusters may then be searched using various combinations of search parameters to obtain relevant file sets.

In one example, a computer-implemented method for expanding relevant search results in electronic discovery may include (1) creating a file-participant cluster that links a file within a data source to a set of participants that had one or more interactions with the file, (2) determining that the file-participant cluster and one or more other file-participant clusters exceed a threshold level of similarity relative to one another, (3) merging the file-participant cluster and the other file-participant cluster into a merged file-participant cluster such that the merged file-participant cluster identifies files and participants linked to one another by the file-participant cluster and the other file-participant cluster, (4) receiving, from a user involved in electronic discovery in connection with a lawsuit, a search query to search the data source for files matching one or more search parameters, and then in response to receiving the search query, (5) determining that the file linked to the set of participants by the file-participant cluster matches the search parameters and (6) providing, to the user involved in the electronic discovery, a search result that identifies the merged file-participant cluster.

In some examples, the method may further include identifying a set of interaction times that each represent a point in time at which at least one of the participants interacted with at least one of the files linked by the file-participant clusters. In one embodiment, the search result may include an indication of the subset of the interaction times at which the participants interacted with one or more of the files linked by the file-participant clusters. In some examples, the method may also include determining, based at least in part on the set of interaction times, that the interactions between the files and participants linked by the file-participant clusters occurred within a certain time period of one another. In one embodiment, the interaction may include (1) creating the file, (2) modifying the file, and/or (3) accessing the file.

In one embodiment, the search parameters may include (1) a period of time, (2) one or more participant names, (3) one or more keywords, and/or (4) one or more cluster attributes. In some examples, the method may further include tagging the file-participant cluster with a set of metadata tags that each define a cluster attribute of the file-participant cluster. In some examples, the method may also include determining that one or more cluster attributes defined by the set of metadata tags matches the search parameters.

In one embodiment, the cluster attribute of the file-participant cluster may include (1) a term describing contents of the file linked by the file-participant cluster, (2) an activity score that indicates a frequency at which the file is referenced by other files within the data source, and/or (3) another file within the data source referenced by the file. In some examples, the method may also include determining, by comparing the search parameters to the file via one or more similarity functions that measures the level of a similarity between the file and the search parameters, that the file matches at least a threshold number of the search parameters.

In some examples, the method may further include determining that the file-participant clusters have a certain percentage of participants in common. In one embodiment, the method may also include determining that at least one additional file linked to participants by at least one additional file-participant cluster matches the search parameters. Additionally or alternatively, the method may include ranking the file-participant cluster and the additional file-participant cluster in order of similarity relative to the search parameters as measured by one or more similarity functions and then providing, to the user involved in the electronic discovery, the search result that identifies the file-participant clusters corresponding to a plurality of files in a ranked order of similarity.

In some examples, the method may also include ranking the file-participant cluster and the additional file-participant cluster in order of occurrence relative to the interactions between the files and participants linked by the file-participant cluster and the additional file-participant cluster. In some examples, the method may further include identifying one or more of the files linked by the merged file-participant cluster that matches the search parameters and/or adding, to the search result provided to the user, one or more other files linked by the merged file-participant cluster that did not match the search parameters.

In one embodiment, a system for implementing the above-described method may include several modules stored in memory, such as (1) a clustering module that creates a file-participant cluster that links a file within a data source to a set of participants that had one or more interactions with the file, (2) a comparison module that determines that the file-participant cluster and one or more other file-participant clusters exceed a threshold level of similarity relative to one another, (3) a merging module that, in response to the determination, merges the file-participant clusters into a merged file-participant cluster such that the merged file-participant cluster identifies files and participants linked to one another by the file-participant cluster and the other file-participant cluster, (4) a communication module that receives, from a user involved in electronic discovery in connection with a lawsuit, a search query to search the data source for files matching one or more search parameters, (5) a search module that, in response to the search query, determines that the file linked to the set of participants by the file-participant cluster matches the search parameters. The communication module provides, to the user involved in the electronic discovery, a search result that identifies the merged file-participant cluster. The system may also include at least one physical processor configured to execute the clustering module, the comparison module, the merging module, the communication module, and the search module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) create a file-participant cluster that links a file within a data source to a set of participants that had one or more interactions with the file, (2) determine that the file-participant cluster and at least one other file-participant cluster exceed a threshold level of similarity relative to one another, (3) merge the file-participant clusters into a merged file-participant cluster such that the merged file-participant cluster identifies files and participants linked to one another by the file-participant clusters, (4) receive, from a user involved in electronic discovery in connection with a lawsuit, a search query to search the data source for files matching one or more search parameters, and then in response to receiving the search query, (5) determine that the file linked to the set of participants by the file-participant cluster matches the search parameters, and (6) provide, to the user involved in the electronic discovery, a search result that identifies the merged file-participant cluster.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is a block diagram of a merged file-participant cluster.

FIG. 6 is a block diagram of an interaction time index.

Figure 1:
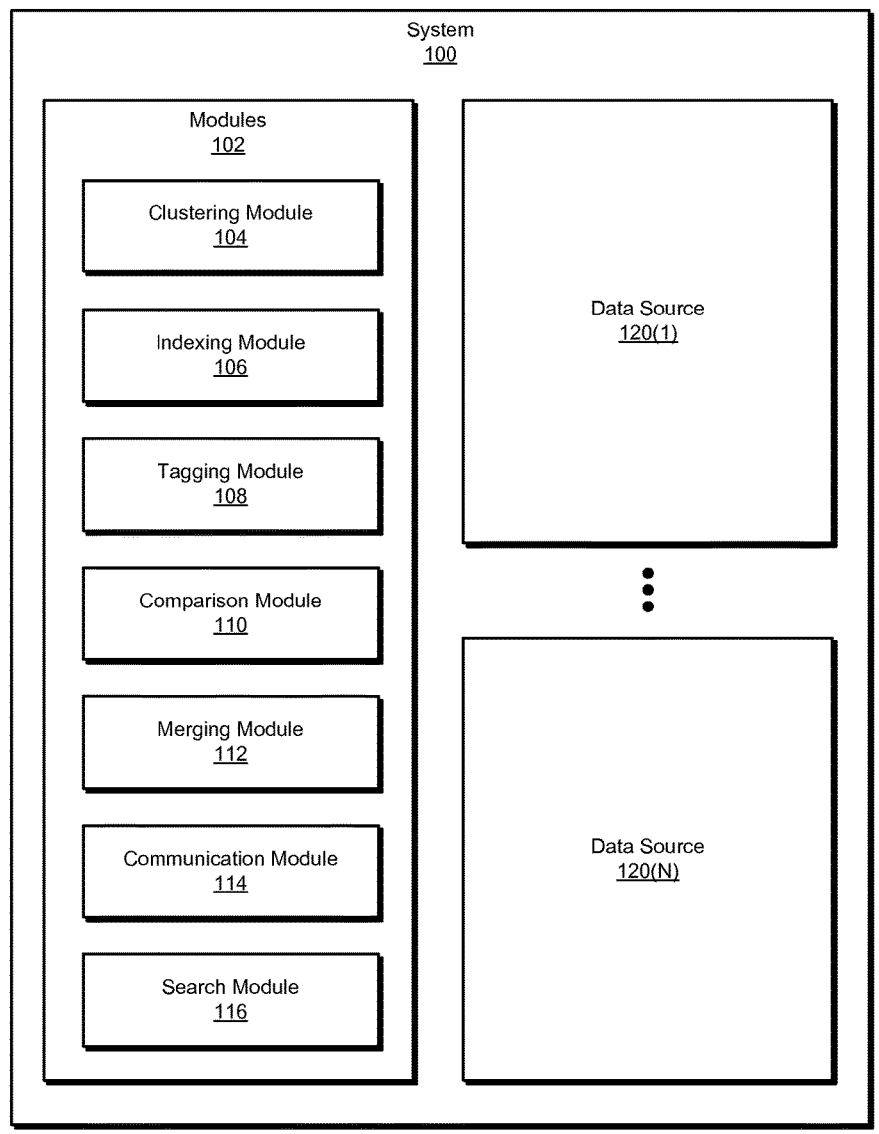
FIG. 1 is a block diagram of an exemplary system for expanding relevant search results in electronic discovery.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for expanding relevant search results in electronic discovery. As will be explained in greater detail below, by creating file-participant clusters that link a file within a data source to a set of participants that interacted with the file, the systems and methods described herein may be able to build data structures that may be efficiently searched for combinations of search parameters. Moreover, by merging file-participant clusters that have certain attributes in common, indexing file-participant interactions based at least in part on time, and tagging the file-participant clusters with metadata tags, the systems and methods described herein may organize information in or from a data source to facilitate expanding and/or prioritizing relevant search results in electronic discovery.

The following will provide, with reference to FIGS. 1-2, and 4-6, detailed descriptions of exemplary systems for expanding relevant search results in electronic discovery. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 7 and 8, respectively.

FIG. 1 is a block diagram of exemplary system 100 for expanding relevant search results in electronic discovery. As illustrated in this figure, exemplary system 100 may include one or more modules 102 for performing one or more tasks. For example, and as will be explained in greater detail below, exemplary system 100 may also include a clustering module 104 that may create a file-participant cluster that links a file within a data source to a set of participants that had at least one interaction with the file. Exemplary system 100 may also include an indexing module 106 that may identify a set of interaction times that each represent a point in time at which one or more of the participants interacted with one or more of the files linked by the file-participant clusters. Exemplary system 100 may also include a tagging module 108 that tags the file-participant cluster with a set of metadata tags that each define a cluster attribute of the file-participant cluster. Exemplary system 100 may additionally include a comparison module 110 that may determine that the file-participant cluster and at least one other file-participant cluster exceed a threshold level of similarity relative to one another. Exemplary system 100 may also include a merging module 112 that may, in response to determining that the file-participant cluster and the other file-participant cluster exceed the threshold level of similarity relative to one another, merge the file-participant cluster and the other file-participant cluster into a merged file-participant cluster such that the merged file-participant cluster identifies files and participants linked to one another by the file-participant clusters.

Exemplary system 100 may additionally include a communication module 114 that may receive, from a user involved in electronic discovery in connection with a lawsuit, a search query to search the data source for files matching one or more search parameters. Exemplary system 100 may also include a search module 116 that may determine that the file linked to the set of participants by the file-participant cluster matches the search parameters. Communication module 114 may also provide, to the user involved in the electronic discovery, a search result that identifies the merged file-participant cluster. Although illustrated as separate elements, one or more of modules 102 in FIG. 1 may represent portions of a single module or application (such as an electronic discovery tool).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more data sources, such as data sources 120(1)-(N). In one example, data sources 120(1)-(N) may be configured to store documents or other files to be searched in the process of electronic discovery. Data sources 120(1)-(N) may represent portions of a single database or computing device or a plurality of data repositories or computing devices. For example, data sources 120(1)-(N) may represent a portion of server 206 in FIG. 2, computing system 710 in FIG. 7, and/or portions of exemplary network architecture 800 in FIG. 8. Alternatively, data sources 120(1)-(N) in FIG. 1 may represent one or more physically separate devices capable of being accessed by a computing device, such as server 206 in FIG. 2, computing system 710 in FIG. 7, and/or portions of exemplary network architecture 800 in FIG. 8.

Figure 2:
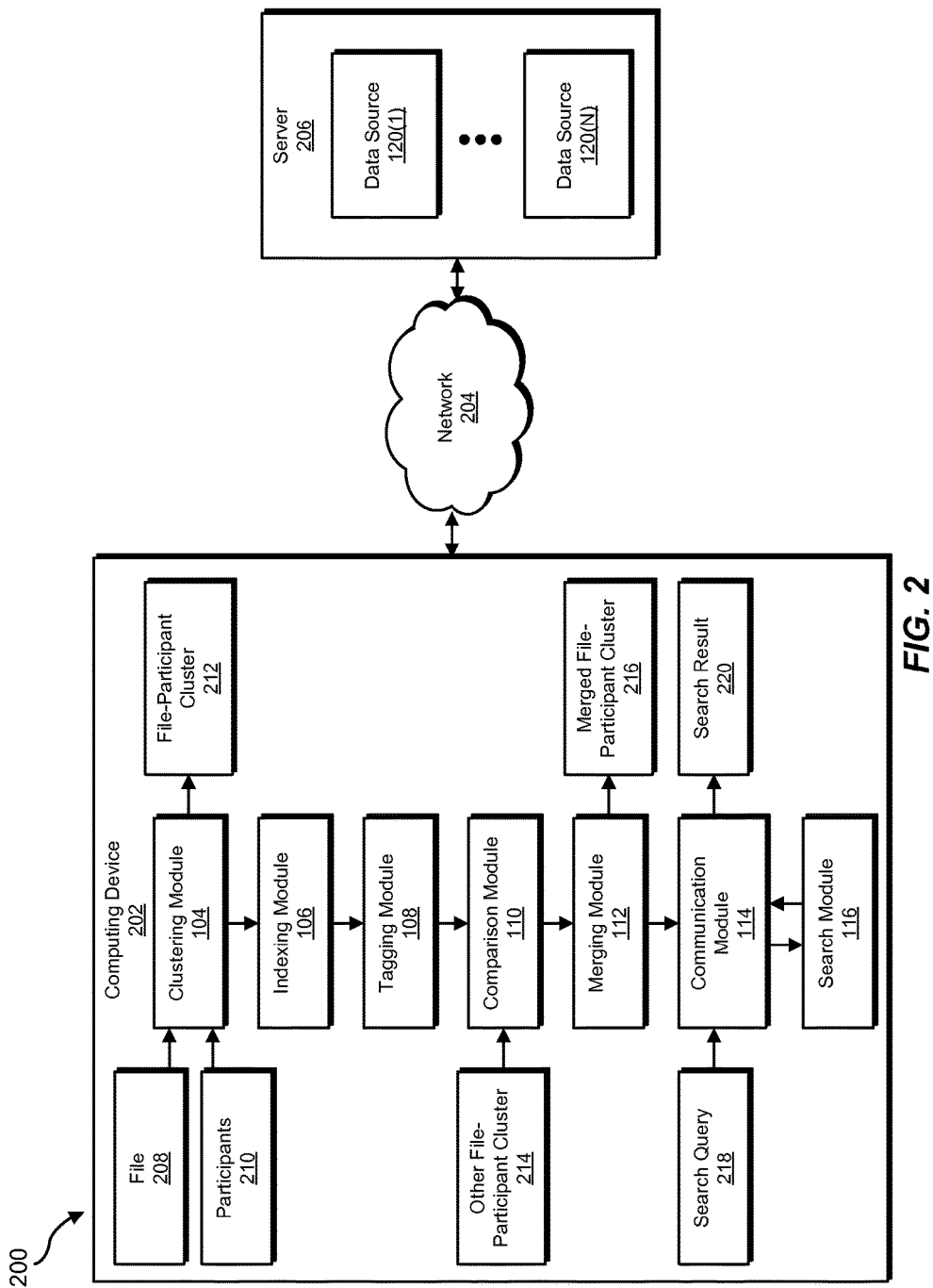
FIG. 2 is a block diagram of an additional exemplary system for expanding relevant search results in electronic discovery.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in data sources 120(1)-(N). Additionally or alternatively, server 206 may be programmed with one or more of modules 102 and/or may store all or a portion of the data in data sources 120(1)-(N).

In one embodiment, one or more of modules 102 from FIG. 1 may, when executed by at least one processor of computing device 202 and/or server 206, enable computing device 202 and/or server 206 to expand relevant search results in electronic discovery. For example, and as will be described in greater detail below, one or more of modules 102, such as clustering module 104, may cause computing device 202 and/or server 206 to create a file-participant cluster 212 that links a file 208 within a data source 120(1)-(N) to a set of participants 210 that had at least one interaction with file 208. Indexing module 106 may identify a set of interaction times that each represent a point in time at which one or more of the participants interacted with one or more of the files linked by the file-participant clusters 212 and 214. Tagging module 108 may tag file-participant cluster 212 with a set of metadata tags that each define a cluster attribute of file-participant cluster 212. Comparison module 106 may determine that file-participant cluster 212 and at least one other file-participant cluster 214 exceed a threshold level of similarity relative to one another. Merging module 112 may, in response to determining that file-participant cluster 212 and the other file-participant cluster 214 exceed the threshold level of similarity relative to one another, merge file-participant cluster 212 and the other file-participant cluster 214 into a merged file-participant cluster 216 such that the merged file-participant cluster 216 identifies files and participants linked to one another by file-participant cluster 212 and the other file-participant cluster 214. Communication module 114 may receive, from a user involved in electronic discovery in connection with a lawsuit, a search query 218 to search data source 120(1)-(N) for files matching one or more search parameters. Search module 116 may determine that file 208 linked to the set of participants 210 by file-participant cluster 212 matches the search parameters. Communication module 114 may provide, to the user involved in the electronic discovery, search result 220 that identifies the merged file-participant cluster 216.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 710 in FIG. 7, or any other suitable computing device.

Server 206 generally represents any type or form of computing device that is capable of storing, comparing, and/or providing data. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing device 202 and server 206.

Figure 3:
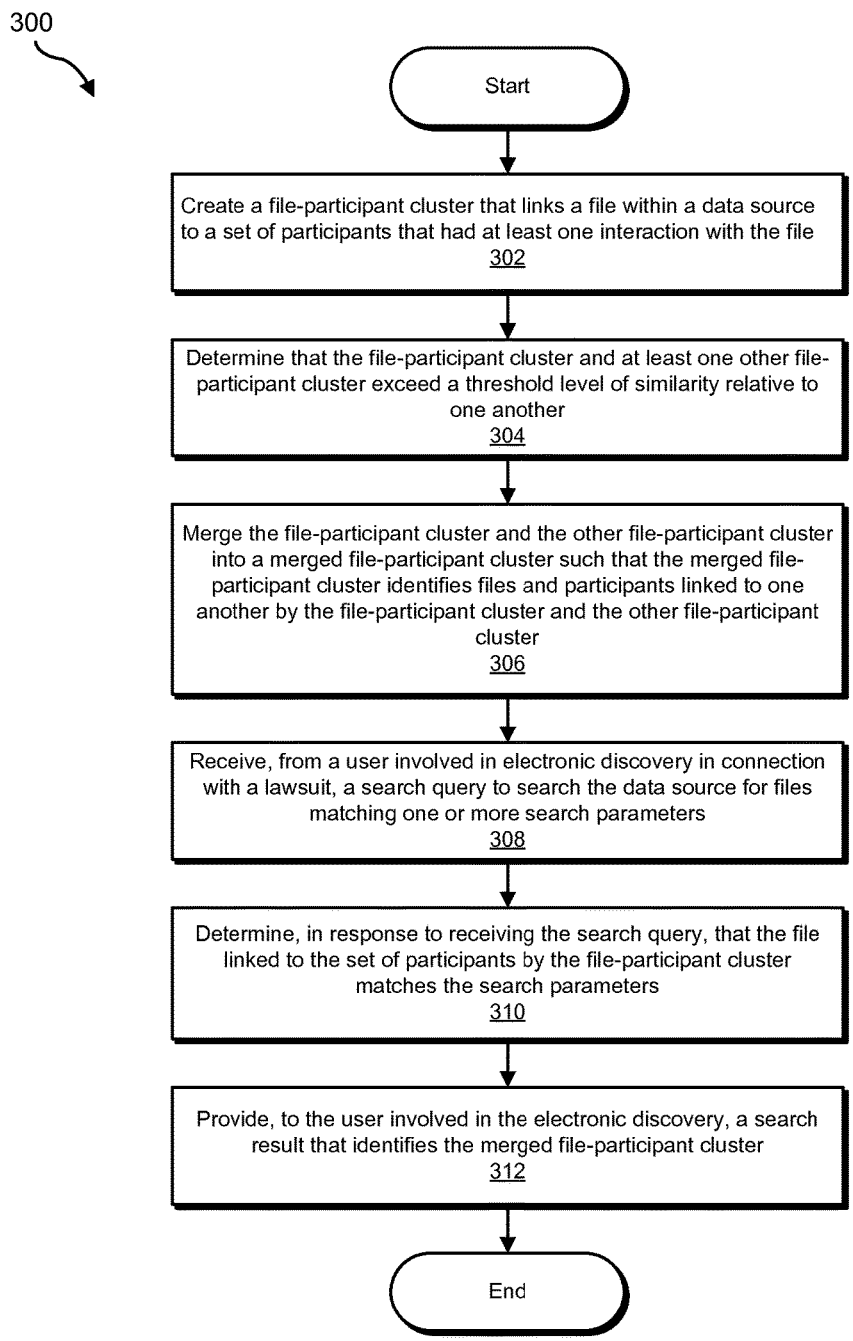
FIG. 3 is a flow diagram of an exemplary method for expanding relevant search results in electronic discovery.

FIG. 3 is a flow diagram of an exemplary computer-implemented method 300 for expanding relevant search results in electronic discovery. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may create a file-participant cluster that links a file within a data source to a set of participants that had at least one interaction with the file. For example, clustering module 104 may, as part of computing device 202 in FIG. 2, create a file-participant cluster 212 that links file 208 within data source 120(1)-(N) to a set of participants 210 that had at least one interaction with file 208.

The term "file-participant cluster," as used herein, generally refers to a data structure that links a file to participants who interacted with the file in some way. Participants may include computer users and/or computer programs. Interactions may include creating the file, modifying the file, reading the contents of the file, or otherwise accessing the file (such as copying or moving the file). File-participant clusters may be represented by a simple connected graph with a central node representing the file connected to a set of nodes representing the participants.

Figure 4:
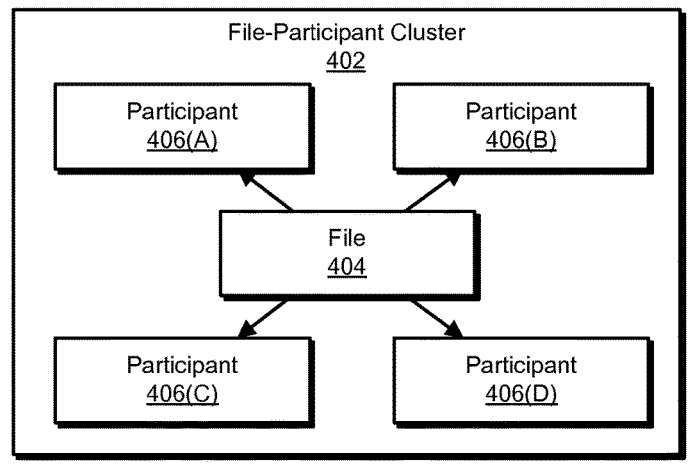
FIG. 4 is a block diagram of representations of file-participant clusters.
Figure 4:
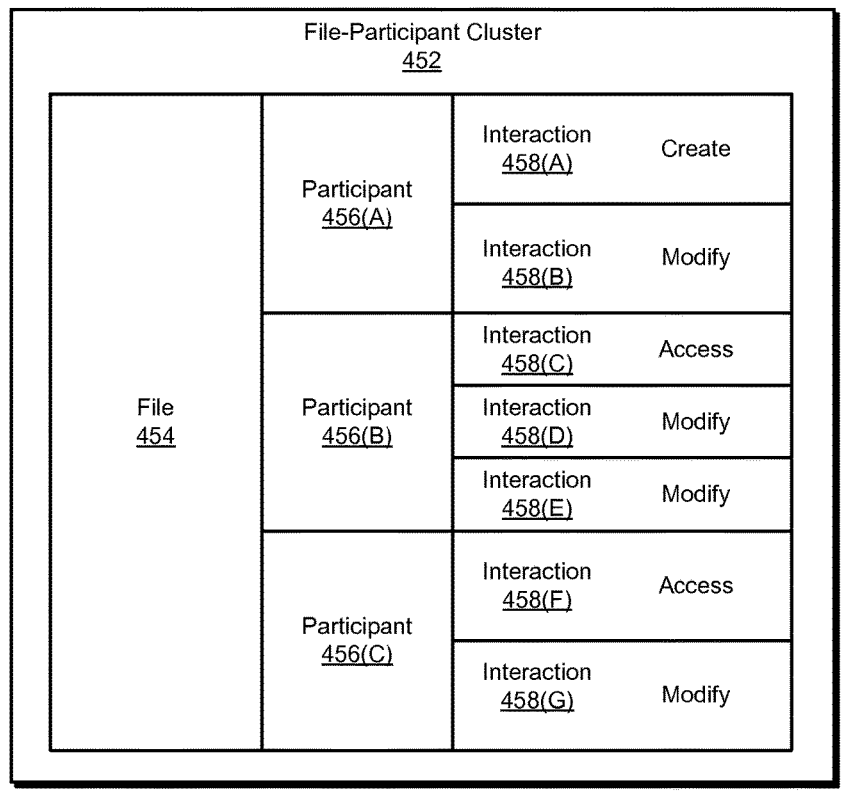

FIG. 4 depicts representations of two file-participant clusters 402 and 452. As shown in FIG. 4, file-participant cluster 402 may include a graphical representation of a file 404 connected to four participants 406(A)-(D). File-participant cluster 452 may include a tabular representation of a file 454 and three participants 456(A)-(C). Participant 456(A) may have had two interactions with file 454 (in this example, a create interaction 458(A) and a modify interaction 458(B)). Participant 456(B) may have had three interactions with file 454 (in this example, an access interaction 458(C), a modify interaction 458(D), and another modify interaction 458(E)). Participant 456(C) may have had two interactions with file 454 (an access interaction 458(F) and a modify interaction 458(G)).

Clustering module 104 may create a file-participant cluster in a variety of ways. In one example, clustering module 104 may use data structures or database records to organize and store file-participant cluster data. For example, clustering module 104 may organize a file-participant cluster using a data structure that includes a link to the file in the data source and a link to a linked list of participant records. In this example, the linked list may start with the file creator and continue in a linked chronological order.

In another example, clustering module 104 may create tables in a relational database for files and participants along with interaction records that contain fields for the interaction type, a timestamp, and foreign keys for the entries in the file and participant tables related to the interaction. Because file-participant cluster data may be easily represented in graph form, clustering module 104 may gain certain advantages in performance, data storage efficiency, and database design by using a graph database to store file-participant cluster data.

At step 304, one or more of the systems described herein may determine that the file-participant cluster and at least one other file-participant cluster exceed a threshold level of similarity relative to one another. For example, comparison module 110 may, as part of computing device 202 in FIG. 2, determine that file-participant cluster 212 and at least one other file-participant cluster 214 exceed a threshold level of similarity relative to one another.

Comparison module 110 may determine that the file-participant clusters exceed a threshold level of similarity relative to one another in a variety of ways. For example, comparison module 110 may determine that file-participant cluster 212 and other file-participant cluster 214 exceed the threshold level of similarity relative to one another by determining that the file-participant clusters have a certain percentage of participants in common.

In another example, comparison module 110 may use content analysis tools or a content-processing system to compare the contents of the files linked by file-participant cluster 212 and other file-participant cluster 214 and determine that the contents of the files are similar. A content-processing system may generate a theme vector for each of the two files that may provide a means for comparing the thematic content of two files. As used herein, the term "theme vector" generally refers to a list of themes that identify the overall thematic content of that file. In addition, the theme vector may include a theme weight, corresponding to each theme, that provides a relative measure of thematic importance relative to other themes in the file. Comparison module 110 may determine that the two files linked by the file-participant clusters exceed a minimum level of overlap in their theme vectors, and therefore exceed a threshold level of similarity relative to one another.

In some examples, comparison module 110 may determine that the two file-participant clusters exceed a threshold level of similarity relative to one another by identifying a set of interaction times that each represent a point in time at which at least one of the participants interacted with at least one of the files linked by the file-participant clusters. In these examples, comparison module 110 may determine that file-participant cluster 212 and other file-participant cluster 214 exceed a threshold level of similarity relative to one another by determining, based at least in part on the set of interaction times, that the interactions between the files and participants linked by file-participant cluster 212 and other file-participant cluster 214 occurred within a certain time period of one another.

In some examples, comparison module 110 may create a time-series index (i.e., an index of interaction times) of file-participant clusters with interactions occurring during the same period of time. As will be described in greater detail below, a time-series index may be used to provide more efficient access to a large set of file-participant clusters when searching for interactions that occurred during a certain period of time.

In some examples, tagging module 108 may tag the file-participant cluster with a set of metadata tags that each define a cluster attribute of the file-participant cluster. For example, tagging module 108 may, as part of computing device 202 in FIG. 2, tag file-participant cluster 212 with a set of metadata tags that each define a cluster attribute of file-participant cluster 212. The term "cluster attribute," as used herein, generally refers to a keyword, string, or data element assigned to a file-participant cluster that describes the file-participant cluster or an attribute of the file-participant cluster. Examples of the cluster attribute include, without limitation, a term describing contents of the file linked by the file-participant cluster, an activity score that indicates a frequency at which the file is referenced by other files within the data source, another file within the data source referenced by the file, variations of one or more of the same, combinations of one or more of the same, or any other suitable cluster attribute.

The term "activity score," as used herein, generally refers to the frequency that a file or document is referenced by other files or documents in a data source. Activity scores are typically used as a measure of the significance of a file or document in a collected set of files or documents in a data source. For example, a technical journal article that is frequently cited in other technical journal articles would have a high activity score, and therefore be considered more significant than articles with lower activity scores. Tagging module 108 may calculate an activity score for each file in a data source by first tagging each file-participant cluster with metadata tags identifying other files in the data source that are referenced by the file linked by the file-participant cluster. By counting the number of other files that reference each file, tagging module 108 may calculate an activity score for each file in the data source.

In one embodiment, comparison module 110 may use data included in metadata tags when comparing the similarity two file-participant clusters. As will be described in greater detail below, metadata tags associated with a file-participant cluster may also be used to help locate the file-participant cluster when searching a large collection of file-participant clusters.

At step 306, one or more of the systems described herein may, in response to determining that the file-participant cluster and the other file-participant cluster exceed the threshold level of similarity relative to one another, merge the file-participant cluster and the other file-participant cluster into a merged file-participant cluster such that the merged file-participant cluster identifies files and participants linked to one another by the file-participant cluster and the other file-participant cluster. For example, merging module 112 may, as part of computing device 202 in FIG. 2, merge file-participant cluster 212 and other file-participant cluster 214 into a merged file-participant cluster 216 in response to the determination that file-participant cluster 212 and other file-participant cluster 214 exceed the threshold level of similarity relative to one another. In this example, merged file-participant cluster 216 may identify files and participants linked to one another by file-participant cluster 212 and other file-participant cluster 214.

The term "merged file-participant cluster," as used herein, generally refers to a data structure or database record that combines file data, participant data, and/or interaction data for two or more similar file-participant clusters. In some examples, merged file-participant cluster may include metadata tags describing the two file-participant clusters individually and/or collectively.

FIG. 5 depicts a merged file-participant cluster 500 that merges file-participant clusters for three files 502 (in this example, File A, File B, and File C). As shown in FIG. 5, merged file-participant cluster 500 may include data for three participants 504 (in this example, Participant 1, Participant 2, and Participant 3). Merged file-participant cluster 500 may also include data identifying eight interactions 506 between participants 504 and files 502. Interactions 506 may include an interaction identifiers 101-108 and/or identify which of files 502 and participants 504 are included in the interactions. Interactions 506 may also identify the type of interaction (for example, create, modify, or access) and a timestamp indicating when the interaction occurred.

Merging module 112 may merge two or more file-participant clusters in a variety of ways. For example, merging module 112 may add a link to one of the file-participant clusters in the merger. In this example, the link may indicate another file-participant cluster to which the first file-participant cluster is merged. Accordingly, the merged file-participant cluster may include and/or represent a linked list of file-participant cluster data structures.

In another example, merging module 112 may similarly use links in a graph database or foreign keys in a relational database to create a linked list of file-participant clusters included in the merged file-participant cluster. In another example, merging module 112 may use multiple links or a multi-value field to link each file-participant cluster to all other file-participant clusters in a merged file-participant cluster.

At step 308, one or more of the systems described herein may receive, from a user involved in electronic discovery in connection with a lawsuit, a search query to search the data source for files matching one or more search parameters. For example, communication module 114 may, as part of computing device 202 in FIG. 2, receive search query 218 from a user involved in electronic discovery in connection with a lawsuit. In this example, search query 218 may initiate a search of data sources 120(1)-(N) for files matching one or more search parameters.

Communication module 114 may receive a search query in a variety of ways and/or a variety of contexts. For example, communication module 114 may receive data from a database or web-based form that allows the user to specify search parameters using user certain interface controls (such as drop-down lists, text fields, calendars, etc.). In one embodiment, the search parameters may include a period of time, one or more participant names, one or more keywords, and/or one or more cluster attributes.

As a specific example, communication module 114 may provide a calendar that enables the user to select a start date and an end date that define a specific period of time in which interactions are searched. Communication module 114 may also provide drop-down lists or auto-fill text fields to allow the user to select participants from a set of possible participant names. Similarly, communication module 114 may provide drop-down lists or auto-fill text fields to allow the user to select cluster attributes from a set of possible cluster attribute identifiers.

At step 310, one or more of the systems described herein may determine that the file linked to the set of participants by the file-participant cluster matches the search parameters. For example, search module 116 may, as part of computing device 202 in FIG. 2, determine that file 208 linked to the set of participants 210 by file-participant cluster 212 matches the search parameters received by communication module 114.

Search module 116 may determine that the file linked by the file-participant cluster matches the search parameters in a variety of ways. For example, search module 116 may determine that the file linked to the set of participants by the file-participant cluster matches the search parameters by comparing the search parameters to the file via one or more similarity functions that measure the level of a similarity between the file and the search parameters. If search module 116 determines that the similarity functions indicate that the file matches at least a threshold number of the search parameters, search module 116 may determine that the file matches the search parameters.

The term "similarity function," as used herein, generally refers to any of a variety of functions that compare search parameters to attributes of a file linked by a file-participant cluster. For example, a cosine product or Jaccard index may measure the similarity of a document to a set of keywords in a search query. In one example, search module 116 may identify one or more files linked by file-participant clusters that match the search parameters by determining that one or more cluster attributes defined by metadata tags associated with the file-participant clusters match cluster attributes specified in the search parameters. In some examples, the cluster attributes of the file-participant cluster may include one or more of (1) a term describing the contents of the file linked by the file-participant cluster, (2) an activity score that indicates a frequency at which the file is referenced by other files within the data source, and/or (3) another file within the data source referenced by the file.

In some examples, search parameters may specify a period of time for which search module 116 is to limit its search of interactions between participants and files. For example, search module 116 may determine that the interactions included in file-participant cluster 212 occurred within a period of time specified in the search parameters of search query 218. Search module 116 may then make the determination that the file matches the set of search parameters at least in part by determining that interactions between participants 210 and file 208 linked by file-participant cluster 212 occurred within the period of time specified in search query 218.

Search module 116 may make use of an interaction time index created by indexing module 106 to more efficiently identify interactions that occurred within a specified period of time. FIG. 6 shows an interaction time index 600 of merged file-participant cluster 500 shown in FIG. 5. As shown in FIG. 6, interaction time index 600 may include time stamps 602 from interactions 506 along with a corresponding interaction ID 604. Time stamps 602 may be organized in chronological order to facilitate searching for interactions that occurred within a specified time period. For example, to identify all interactions taking place during September of 2014, search module 116 may begin searching at the first record in interaction time index 600. When search module 116 determines that the third record in the index has a time stamp in October 2014, search module 116 may determine that only interaction records 104 and 108 occurred in September 2014.

A very large interaction time index may also be indexed to allow for more efficient searching. For example, an index to the interaction time index may link to the records at the beginning of each month so that search module 116 may begin searching the interaction time index table at the month of the beginning of the time period specified in the search parameters.

In one embodiment, search module 116 may determine that the file linked to the set of participants by the file-participant cluster matches the search parameters by determining that at least one additional file linked to participants by at least one additional file-participant cluster matches the search parameters. For example, search module 116 may determine that file-participant cluster 212 matches search parameters included in search query 218. Search module 116 may determine that, since other file participant cluster 214 is included in merged file-participant cluster 216 along with file-participant cluster 212, other file-participant cluster 214 also matches the search parameters.

At step 312, one or more of the systems described herein may, in response to determining that the merged file-participant cluster matches the search parameters, provide a search result that identifies the merged file-participant cluster to the user involved in the electronic discovery. For example, communication module 114 may, as part of computing device 202 in FIG. 2, provide a search result 220 to the user involved in the electronic discovery in response to the determination that merged file-participant cluster 216 matches the search parameters. In this example, search result 220 may identify merged file-participant cluster 216.

Communication module 114 may provide search results in a variety of ways and/or contexts. For example, communication module 114 may provide a list of all files linked by file-participant clusters that match search parameters. In one embodiment, the search result may include an indication of the subset of the interaction times at which the participants interacted with at least one of the files linked by file-participant clusters that match the search parameters.

In some examples, search module 116 may rank the files linked by file-participant clusters matching the search parameters in order of similarity relative to the search parameters as measured by one or more similarity functions. Communication module 114 may then provide, to the user involved in the electronic discovery, the search result that identifies the file-participant clusters corresponding to a plurality of files in a ranked order of similarity. In some examples, search module 116 may rank the files linked by file-participant clusters matching the search parameters in order of occurrence time relative to the interactions between the files and participants linked by the file-participant clusters.

In some examples, search module 116 may identify at least one of the files linked by the merged file-participant cluster that matches the search parameters and then add, to the search result provided to the user, at least one other file linked by the merged file-participant cluster that did not match the search parameters. Because files linked to one merged file-participant cluster have been determined to exceed a threshold level of similarity to one another, a file in a merged file-participant cluster that does not match the search parameters may be relevant to the search query as a result of having been identified as similar to another file linked by the merged file-participant cluster that does match the search parameters. In this way, search module 112 and/or communication module 114 may identify files relevant to the search query that do not precisely match the search parameters, thereby expanding the relevant search results in electronic discovery.

As described above, the various systems and methods described herein may create file-participant clusters that link files in a data source to participants who interacted with the files in some way (e.g., by creating, modifying, or accessing the files). The systems and methods described herein may merge file-participant clusters that are similar to one another according to any number of criteria in order to form merged file-participant clusters. Additionally, the systems and methods described herein may tag file-participant clusters with metadata tags that identify attributes of the file-participant clusters (such as topics of the linked files or activity scores). The systems and methods described herein may also create indexes to the file-participant cluster to facilitate efficient searching of the file-participant clusters for file-participant interactions that occurred within a period of time or files linked to file-participant clusters that have been tagged with the same metadata tag. The systems and methods described herein may also prioritize search results so that the files most relevant to a search query are presented first.

Figure 7:
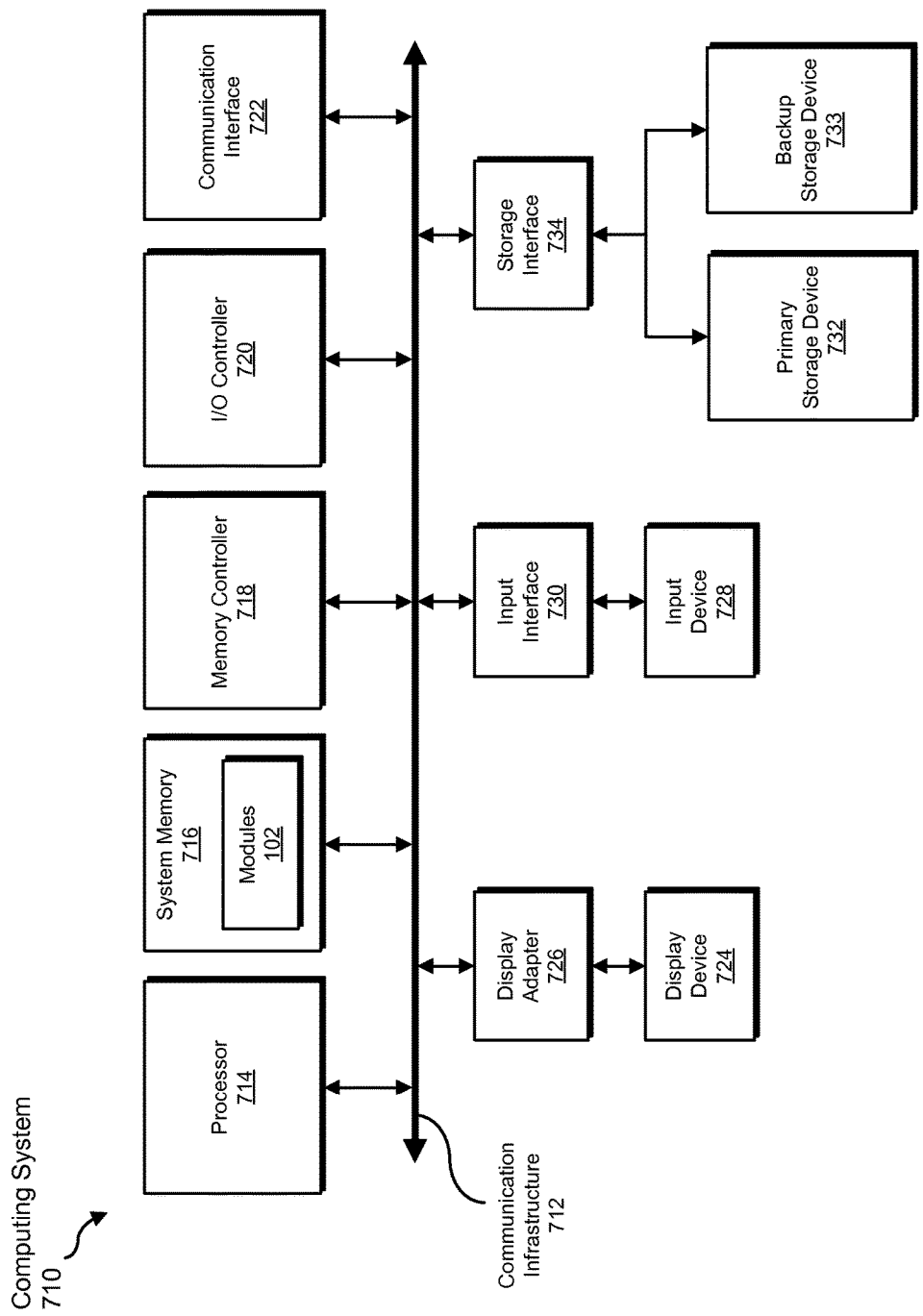
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, data sources 120(1)-(N) from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
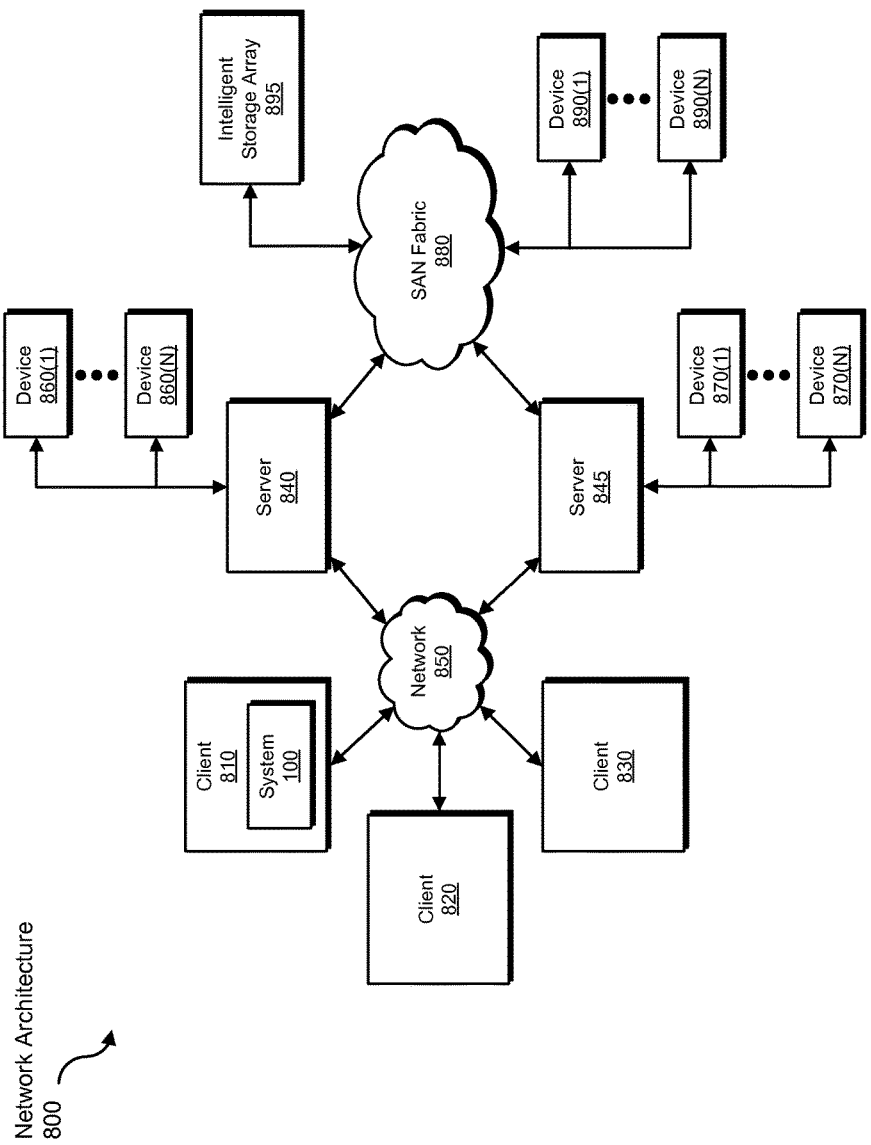
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for expanding relevant search results in electronic discovery.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data to be transformed, transform the data, output a result of the transformation to link files and participants, use the result of the transformation to expand relevant search results in electronic discovery, and store the result of the transformation to facilitate searches of data sources. Additionally, one or more of the modules recited herein may transform a computing system to a system for expanding relevant search results in electronic discovery. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for expanding relevant search results in electronic discovery, at least a portion of the method being performed by a computing device comprising at least one processor, the method comprising:
   creating a file-participant cluster that links a file within a data source to a set of participants that had at least one interaction with the file;
   determining that the file-participant cluster and at least one other file-participant cluster exceed a threshold level of similarity relative to one another;
   in response to determining that the file-participant cluster and the other file-participant cluster exceed the threshold level of similarity relative to one another, merging the file-participant cluster and the other file-participant cluster into a merged file-participant cluster such that the merged file-participant cluster identifies files and participants linked to one another by the file-participant cluster and the other file-participant cluster;
   receiving, from a user involved in electronic discovery in connection with a lawsuit, a search query to search the data source for files matching one or more search parameters;
   identifying a set of interaction times that each represent a point in time at which at least one of the participants interacted with at least one of the files linked by the file-participant cluster or the other file-participant cluster;
   in response to receiving the search query:
      determining that the file linked to the set of participants by the file-participant cluster matches the search parameters;
      providing, to the user involved in the electronic discovery, a search result that identifies the merged file-participant cluster, wherein the search result comprises an indication of the set of the interaction times at which the participants interacted with at least one of the files linked by the file-participant cluster or the other file-participant cluster.

2. The computer-implemented method of claim 1, wherein the search parameters comprise at least one of:
   a period of time;
   one or more participant names.

3. The computer-implemented method of claim 1, wherein determining that the file-participant cluster and the other file-participant cluster exceed the threshold level of similarity relative to one another comprises determining, based at least in part on the set of interaction times, that the interactions between the files and participants linked by the file-participant cluster and the other file-participant cluster occurred within a certain time period of one another.

4. The computer-implemented method of claim 1, wherein the search parameters comprise at least one of:
   one or more keywords;
   one or more cluster attributes.

5. The computer-implemented method of claim 1, further comprising tagging the file-participant cluster with a set of metadata tags that each define a cluster attribute of the file-participant cluster;
   wherein determining that the file linked to the set of participants by the file-participant cluster matches the search parameters comprises determining that one or more cluster attributes defined by the set of metadata tags matches the search parameters.

6. The computer-implemented method of claim 5, wherein the cluster attribute of the file-participant cluster comprises at least one of:
   a term describing contents of the file linked by the file-participant cluster;
   an activity score that indicates a frequency at which the file is referenced by other files within the data source;
   another file within the data source referenced by the file.

7. The computer-implemented method of claim 1, wherein determining that the file linked to the set of participants by the file-participant cluster matches the search parameters comprises determining, by comparing the search parameters to the file via at least one similarity function that measures a level of similarity between the file and the search parameters, that the file matches at least a threshold number of the search parameters.

8. The computer-implemented method of claim 1, wherein determining that the file-participant cluster and the other file-participant cluster exceed the threshold level of similarity relative to one another comprises determining that the file-participant cluster and the other file-participant cluster have a certain percentage of participants in common.

9. The computer-implemented method of claim 1, wherein:
   determining that the file linked to the set of participants by the file-participant cluster matches the search parameters comprises determining that at least one additional file linked to participants by at least one additional file-participant cluster matches the search parameters;
   providing the search result that identifies the merged file-participant cluster comprises:

ranking the file-participant cluster and the additional file-participant cluster in order of similarity relative to the search parameters as measured by one or more similarity functions;

providing, to the user involved in the electronic discovery, the search result that identifies file-participant clusters that correspond to a plurality of files in a ranked order of similarity.

10. The computer-implemented method of claim 9, wherein ranking the file-participant cluster and the additional file-participant cluster comprises ranking the file-participant cluster and the additional file-participant cluster in order of occurrence relative to the interactions between the files and participants linked by the file-participant cluster and the additional file-participant cluster.

11. The computer-implemented method of claim 9, wherein providing the search result that identifies the merged file-participant cluster comprises:
 identifying at least one of the files linked by the merged file-participant cluster that matches the search parameters;
 adding, to the search result provided to the user, at least one other file linked by the merged file-participant cluster that did not match the search parameters.

12. The computer-implemented method of claim 1, wherein the interaction comprises at least one of:
 creating the file;
 modifying the file;
 accessing the file.

13. A system for expanding relevant search results in electronic discovery, the system comprising:
 a clustering module, stored in memory, that creates a file-participant cluster that links a file within a data source to a set of participants that had at least one interaction with the file;
 a comparison module, stored in memory, that determines that the file-participant cluster and at least one other file-participant cluster exceed a threshold level of similarity relative to one another;
 a merging module, stored in memory, that merges, in response to determining that the file-participant cluster and the other file-participant cluster exceed the threshold level of similarity relative to one another, the file-participant cluster and the other file-participant cluster into a merged file-participant cluster such that the merged file-participant cluster identifies files and participants linked to one another by the file-participant cluster and the other file-participant cluster;
 a communication module, stored in memory, that receives, from a user involved in electronic discovery in connection with a lawsuit, a search query to search the data source for files matching one or more search parameters;
 an indexing module, stored in memory, that identifies a set of interaction times that each represent a point in time at which at least one of the participants interacted with at least one of the files linked by the file-participant cluster or the other file-participant cluster;
 a search module, stored in memory, that determines, in response to the search query, that the file linked to the set of participants by the file-participant cluster matches the search parameters;
 wherein the communication module provides, in response to the search query, a search result to the user involved in the electronic discovery, the search result identifying the merged file-participant cluster, wherein the search result comprises an indication of the set of the interaction times at which the participants interacted with at least one of the files linked by the file-participant cluster or the other file-participant cluster;
 at least one physical processor configured to execute the clustering module, the comparison module, the merging module, the communication module, the indexing module, and the search module.

14. The system of claim 13,
 wherein the search parameters comprise at least one of:
 a period of time;
 one or more participant names.

15. The system of claim 13, wherein the comparison module determines that the file-participant cluster and the other file-participant cluster exceed the threshold level of similarity relative to one another by determining, based at least in part on the set of interaction times, that the interactions between the files and participants linked by the file-participant cluster and the other file-participant cluster occurred within a certain time period of one another.

16. The system of claim 13, wherein the search parameters comprise at least one of:
 one or more keywords;
 one or more cluster attributes.

17. The system of claim 13, further comprising a tagging module, stored in memory, that tags the file-participant cluster with a set of metadata tags that each define a cluster attribute of the file-participant cluster;
 wherein determining that the file linked to the set of participants by the file-participant cluster matches the search parameters comprises determining that one or more cluster attributes defined by the set of metadata tags matches the search parameters.

18. The system of claim 17, wherein the cluster attribute of the file-participant cluster comprises at least one of:
 a term describing contents of the file linked by the file-participant cluster;
 an activity score that indicates a frequency at which the file is referenced by other files within the data source;
 another file within the data source referenced by the file.

19. The system of claim 13, wherein the comparison module determines that the file linked to the set of participants by the file-participant cluster matches the search parameters by determining, by comparing the search parameters to the file via at least one similarity function that measures a level of similarity between the file and the search parameters, that the file matches at least a threshold number of the search parameters.

20. A non-transitory computer-readable medium comprising one or more computer-readable instructions that, when executed by at least one processor of a computing device, cause the computing device to:
 create a file-participant cluster that links a file within a data source to a set of participants that had at least one interaction with the file;
 determine that the file-participant cluster and at least one other file-participant cluster exceed a threshold level of similarity relative to one another;
 in response to determining that the file-participant cluster and the other file-participant cluster exceed the threshold level of similarity relative to one another, merge the file-participant cluster and the other file-participant cluster into a merged file-participant cluster such that the merged file-participant cluster identifies files and participants linked to one another by the file-participant cluster and the other file-participant cluster;

receive, from a user involved in electronic discovery in connection with a lawsuit, a search query to search the data source for files matching one or more search parameters;

identify a set of interaction times that each represent a point in time at which at least one of the participants interacted with at least one of the files linked by the file-participant cluster or the other file-participant cluster;

determine that the file linked to the set of participants by the file-participant cluster matches the search parameters;

provide, to the user involved in the electronic discovery, a search result that identifies the merged file-participant cluster, wherein the search result comprises an indication of the set of the interaction times at which the participants interacted with at least one of the files linked by the file-participant cluster or the other file-participant cluster.

* * * * *